(12) United States Patent
Keller

(10) Patent No.: US 9,567,019 B2
(45) Date of Patent: Feb. 14, 2017

(54) SELF-PROPELLED, PREFERABLY SINGLE AXIS, MOTOR DRIVEN WORK MACHINE FOR MOVING AND/OR DRIVING WORK TOOLS MOUNTED ON THE MACHINE

(71) Applicant: Rapid Technic AG, Killwangen (CH)

(72) Inventor: Beat Keller, Bremgarten (CH)

(73) Assignee: RAPID TECHNIC AG, Killwangen (CH)

( * ) Notice: Subject to any disclaimer, the term of this patent is extended or adjusted under 35 U.S.C. 154(b) by 0 days.

(21) Appl. No.: 14/514,783

(22) Filed: Oct. 15, 2014

(65) Prior Publication Data

US 2015/0107916 A1 Apr. 23, 2015

(30) Foreign Application Priority Data

Oct. 20, 2013 (EP) ..................................... 13405119

(51) Int. Cl.
*B62D 51/06* (2006.01)
*B60K 17/28* (2006.01)
(Continued)

(52) U.S. Cl.
CPC ............. *B62D 51/06* (2013.01); *B60K 7/0015* (2013.01); *B60K 17/28* (2013.01); *B62D 11/006* (2013.01); *B60Y 2200/225* (2013.01)

(58) Field of Classification Search
CPC ......... A01B 3/08; A01B 33/02; A01B 33/028; B60K 17/04; B60Y 2200/225; B62D 49/06; B62D 51/00; B62D 51/06; B62D 51/002
(Continued)

(56) References Cited

U.S. PATENT DOCUMENTS 4,650,058 A * 3/1987 Vaughan .............. B65G 41/008
180/16
7,740,091 B2 * 6/2010 Bartel .................... A01D 34/68
180/19.1
(Continued)

FOREIGN PATENT DOCUMENTS

EP 2583541 A1 4/2013
EP 12405055 A1 12/2013

*Primary Examiner* — Kevin Hurley
*Assistant Examiner* — Felicia L Brittman
(74) *Attorney, Agent, or Firm* — Lucas & Mercanti, LLP; Klaus P. Stoffel

(57) ABSTRACT

A self-propelled single axis motor driven work machine for propelling and/or for driving communal or agricultural work devices mounted on a mounting device. A drive motor is fastened to an undercarriage or machine chassis, and a drive axle protrudes transversely of the direction of movement from both sides of the undercarriage or machine chassis and is hydraulically driven by the drive motor. The drive axle has at both ends a wheel connected to a drive shaft which is connected on the operator's side thereof to the undercarriage and machine chassis with mounted guide rods for manually steering the work machine and for arranging an actuating member for operating and controlling drive units having hydraulic pumps and hydraulic motors, for driving and steering the wheels of the drive axle. The hydraulic pump connected for steering to the actuating member includes an adjusting member which is coupled adjustably to a control shaft that is mounted to a frame that is mounted to the undercarriage or machine chassis so as to be pivotable about an axis approximately perpendicular to the ground.

15 Claims, 5 Drawing Sheets

(51) Int. Cl.
*B62D 11/00* (2006.01)
*B60K 7/00* (2006.01)

(58) Field of Classification Search
USPC .................................. 180/19.31, 19.2, 19.3
See application file for complete search history.

(56) References Cited

U.S. PATENT DOCUMENTS

2005/0103541 A1\* 5/2005 Nelson ............... B62D 53/0864
180/19.1
2013/0175105 A1\* 7/2013 Gallazzini ............ B62D 11/006
180/170

\* cited by examiner

SELF-PROPELLED, PREFERABLY SINGLE AXIS, MOTOR DRIVEN WORK MACHINE FOR MOVING AND/OR DRIVING WORK TOOLS MOUNTED ON THE MACHINE

CROSS-REFERENCE TO RELATED APPLICATIONS

The present application claims priority of EP 13 405 119.2, filed Oct. 20, 2013, the priority of this application is hereby claimed and this application is incorporated herein by reference.

BACKGROUND OF THE INVENTION

The invention relates to a self-propelled, preferably single axis, motor driven work machine for moving and/or driving communal or agricultural work devices mounted on a mounting device, with a drive motor fastened to a machine or chassis, and with a hydraulically driven drive axis arranged on both sides of the machine or chassis, and protruding transversely of the direction of movement, which at each end thereof has a wheel connected to a drive shaft, and on an operating side, guide bars are provided for manually steering the work machine and for arranging an actuating member for operating and controlling the drive units formed of its hydraulic pump and hydraulic motor associated with the wheels of the drive axis. Work machines of this type are described, for example, in pre published EP 2 583 541 A1 or EP 12 405 055.0. These machines can be switched from a forward movement into a rearward movement and have actuating handles at the free ends of the cantilever-like guide bars. For adjusting or changing the speed of transport of the work machine and/or the work speed of the work devices, a manually adjustable actuating member, acting in a controlling manner on the drive motor, is attached to a guide bar. For this purpose, for example, an actuating handle or a rotating handle is used at the free end of the one guide bar, which is connected through a double Bowden cable to the drive units.

Steering of such work machines by means of guide bars requires, particularly in pathless terrain, a high manual exertion by the operating person, which causes the travel and work accuracy, as well as the work safety for persons and machine, to be impaired or reduced.

SUMMARY OF THE INVENTION

Therefore, it is the object of the present invention to provide a work machine of the above described type which facilitates working the machine with greater safety and precision.

In accordance with the present invention, this object is met in that the hydraulic pump connected for steering to the actuating member comprises an adjusting member which, arranged so as to be pivotable about an axis which is directed approximately perpendicular to the ground, is adjustably coupled to an adjustable control shaft provided for steering and mounted to the machine chassis. Consequently, the requirements made of a work machine and man are met.

It is advantageous that the adjusting member is connected through a lever gear system to the control shaft, so that a reliable and exact pump adjustment can be achieved.

In order to be able to carry out a direct effect on the undercarriage through a pivoting movement of the guide bars, the guide bars are preferably fastened to the undercarriage laterally offset relative to the pivoting axis.

In order to achieve a stable arrangement and accessibility, the undercarriage is advantageously or usefully arranged, as seen in the conveying direction of the work machine, on the rearward side of the machine or chassis or on the operator's side.

It is essential for a reliable operation of the work machine that the undercarriage is supported by means of offset elastic, preferably elastomer bearings of an elastic material at the end side or front side of the machine chassis.

It has been found an advantageous fastening and construction concept if the bearings are fastened at the inner side of the rear wall of the cross section of the undercarriage, formed as a C section.

Preferably, an upper and a lower flange of the undercarriage are provided at the machine or chassis at a distance one above the other for forming pivot bearings composed of individual layers at an approximately vertical axis, which has been found to be a simple construction principle.

The rope pulls forming the actuating member of the pumps of the drive units are advantageously connected to a double lever fastened to the control shaft, wherein the double lever can be adjusted or controlled in a precise manner in an appropriately selected direction of movement of the work machine.

In an advantageous and simple manner, the control shaft is supported below the lower flange of the undercarriage, so that the adjustment or change of the lever gear system becomes easily accessible.

A simple actuation of the lever gear system and the adjustment members of the pump can be offered if corresponding lever or pivot arms assigned at each lever gear system respectively are attached to the control shaft.

In order to achieve a solid arrangement of the rope pulls, the rope pulls are advantageously fastened to the upper flange of the undercarriage.

In order to protect and directly assign the rope pulls, a recess is provided in the lower flange for one of the rope pulls through which the respective rope pull is guided.

For an easier selection of the direction of movement and for steering the work machine to the necessary extent, the control shaft or the lever gear system and/or the adjusting member are held by a spring force in an initial position for ensuring a straight travel.

For limiting the pivoting positions of the undercarriage, the rear wall of the undercarriage advantageously has slots or throughopenings extending transversely of the direction of movement which are penetrated by pivoting limiters attached to the machine or chassis and determine the pivoting movement of the undercarriage.

For an optimum steering of the work machine, the ratio of the distance of the travel axis from the pivoting axis of the undercarriage and the distance of the pivoting axis of the undercarriage from the free end of the guide bars is ≤2:1, and results in a lower force requirement for operating the work machine.

The various features of novelty which characterize the invention are pointed out with particularity in the claims annexed to and forming a part of the disclosure. For a better understanding of the invention, its operating advantages, specific objects attained by its use, reference should be had to descriptive matter in which there are described preferred embodiments of the invention.

DETAILED DESCRIPTION OF THE INVENTION

Figure 1:
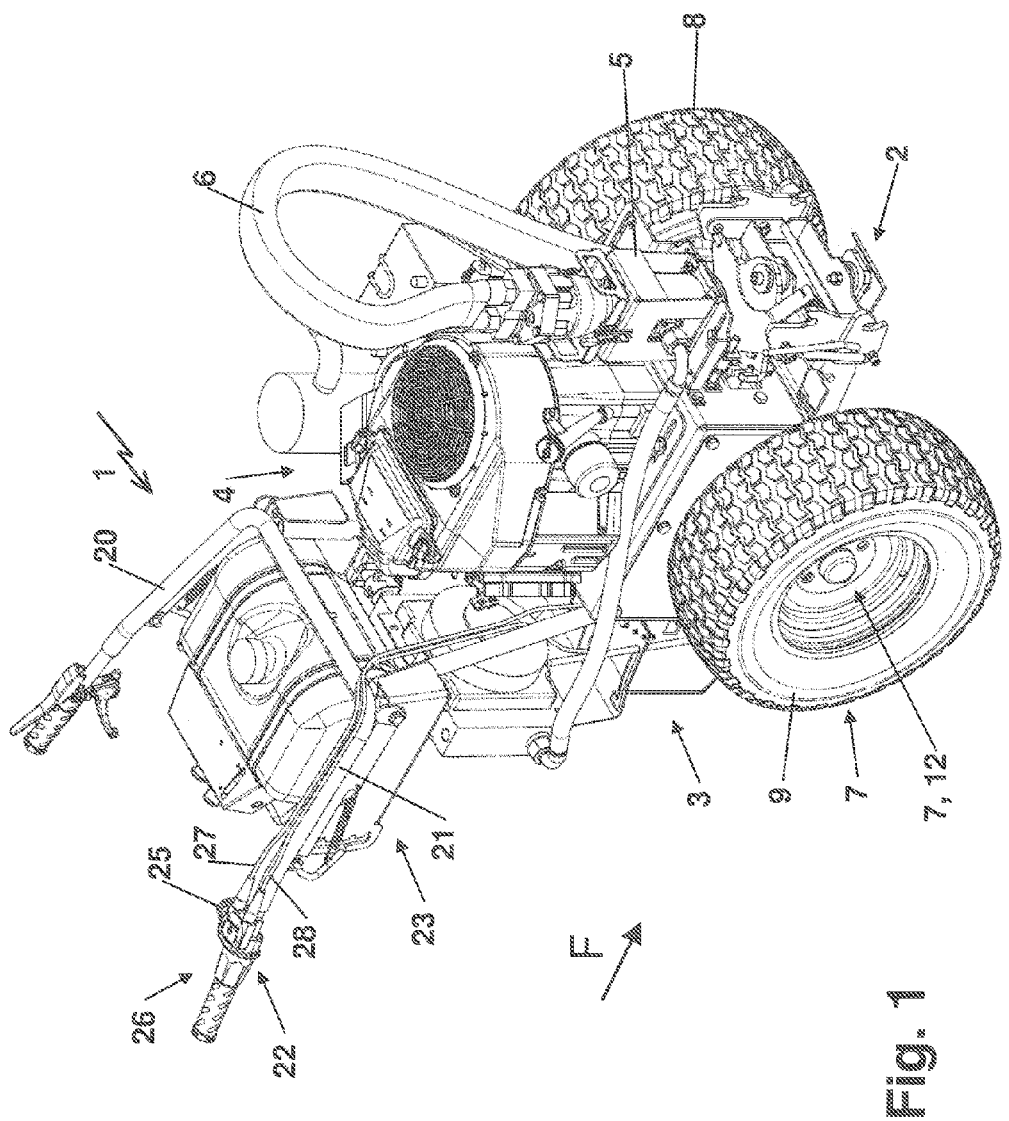
FIG. 1 shows a perspective view of a work machine according to the invention.

FIG. 1 shows a self-propelled single axis work machine 1 capable of being operated by one person for effecting a pushed or pulled movement and/or for driving a mounted device 2 provided at the front side, such as a snow blower, a snow plow, a sweeping brush or mowing works, as they are used for the communal and/or agricultural use and maintenance.

The work machine 1 has a drive motor 4, preferably an internal combustion engine that is mounted on a driveable machine or chassis 3 and includes a stationary drive shaft which is connected through a mechanical gear unit (not visible) which is connected to a hydraulic pump 5 for a flexible work shaft 6 for coupling with mounted work devices (EP 13 405 102.8). Of course, a drive motor with a lying/horizontal drive shaft and/or a mechanically driven pinion shaft can be used for driving the work devices or for the same purpose.

The work machine 1 is usually equipped with a reversible drive motor which permits a travel direction directed opposite the direction of movement F.

A reversal of the drive is also provided for the operation of the work devices.

The work machine 1 includes a travel axis 7 which is connected to the machine chassis or undercarriage transversely of the moving direction F and has wheels 8, 9 at the ends provided for a traveling movement of the work machine 1, wherein the travel axis 7 is formed by two drive shafts 12, 13 with stub axles 10, 11 each having one wheel 8, 9 and protruding laterally from the machine chassis or undercarriage 3, wherein the drive shafts 12, 13 are each assigned to a hydraulic drive unit 18, 19 each consisting of a hydraulic pump 14, 15 and a hydraulic motor 16, 17 which are connected for driving to the drive motor 4.

Mounted on the operator's side of the machine chassis or undercarriage 3 or the front side of the work machine are two laterally spaced apart guide bars 20, 21 for a person to manually steer and operate the work machine 1 and/or the work devices, on the end of which an operating and activating member 22 is fastened for the operation of the work machine 1 and/or the work devices.

Figure 2:
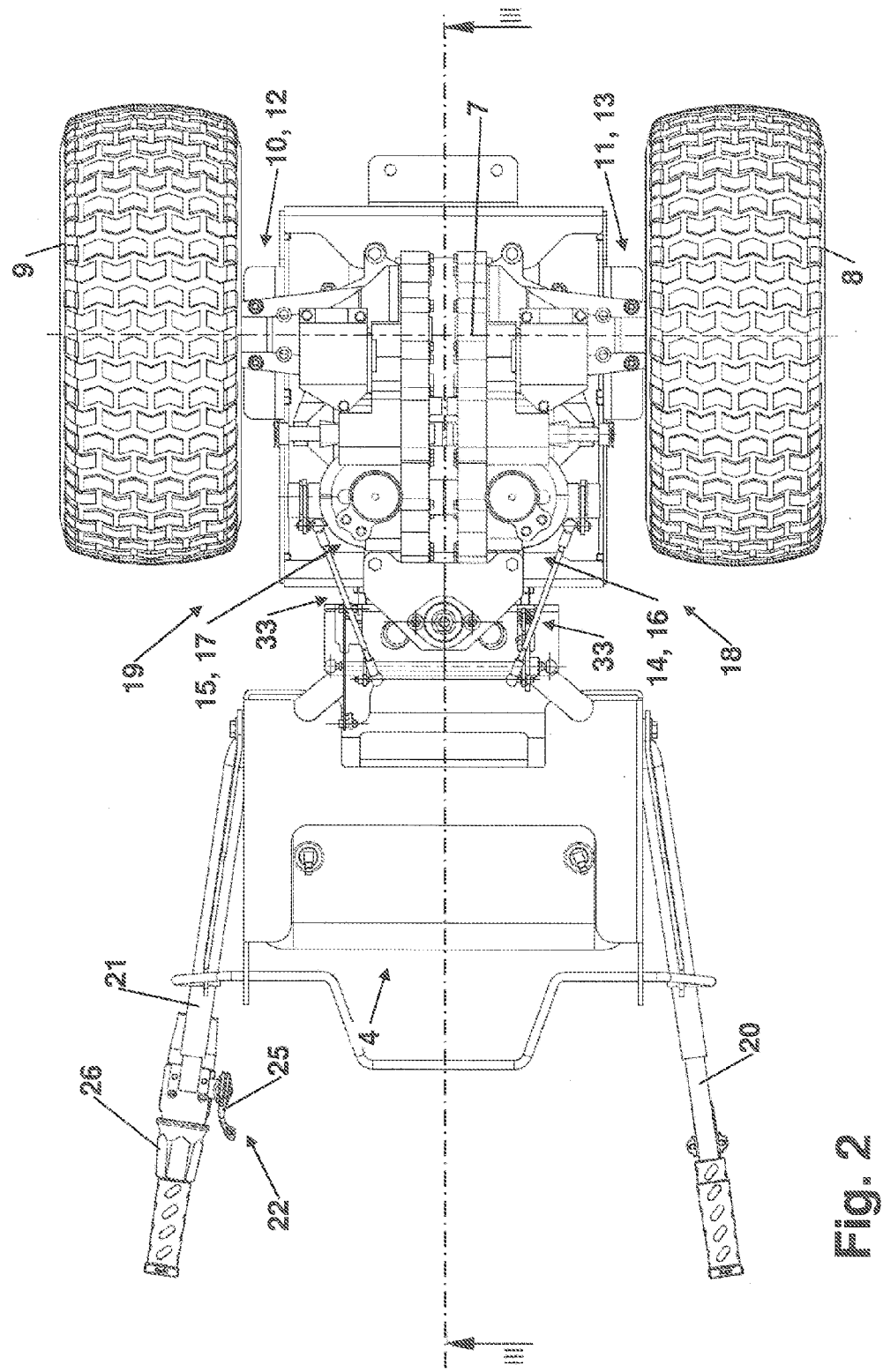
FIG. 2 is an elevational view of the work machine in FIG. 1 from below.
Figure 3:
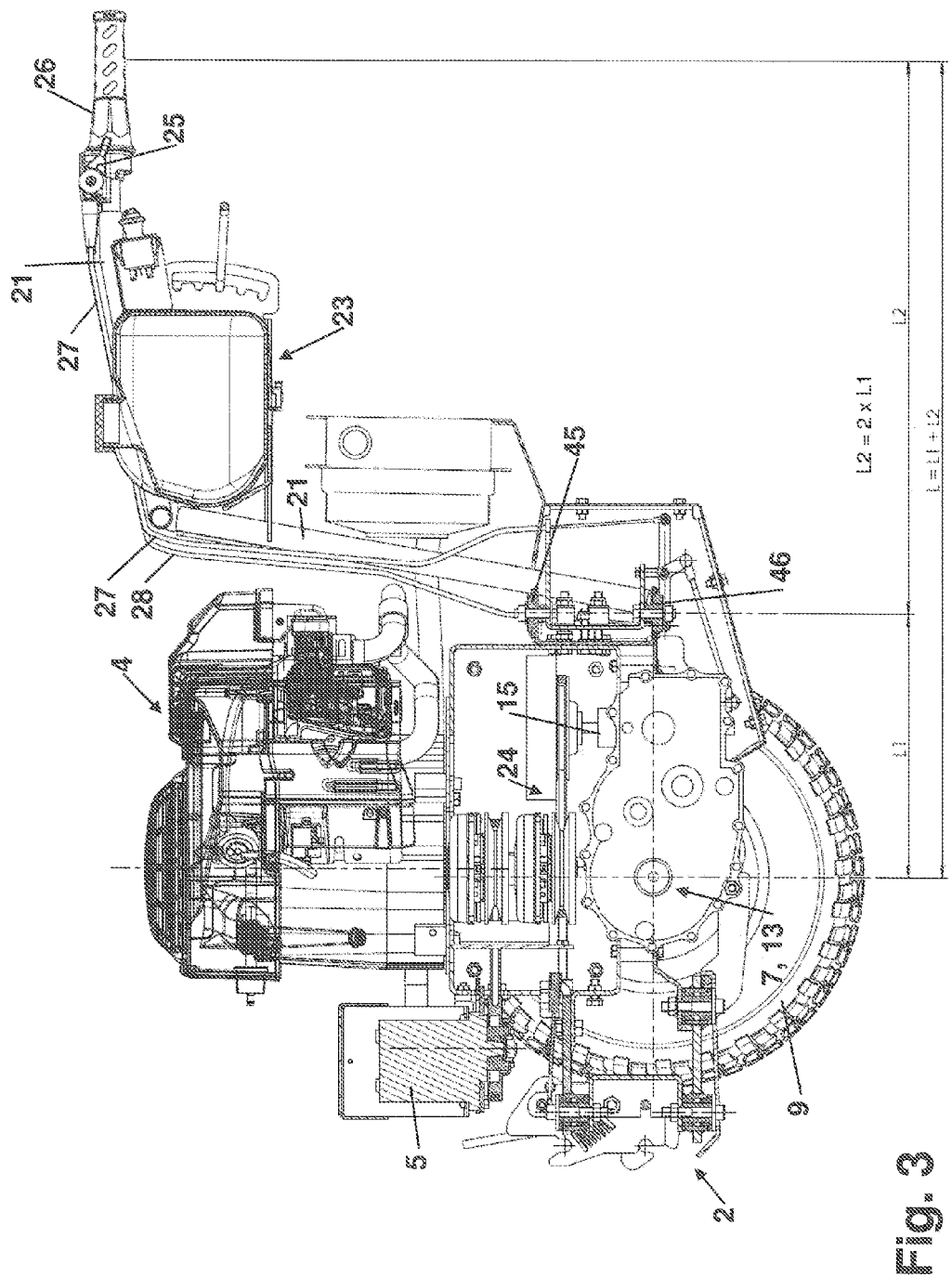
FIG. 3 is a longitudinal sectional view through the work machine along the sectional line III-III in FIG. 2.

Moreover, FIGS. 1 to 3 show a fuel tank 23 which belongs to the drive motor 4.

FIG. 3 shows an intermediate gear unit 24 constructed as belt or chain linkage which connects the drive motor 4 to the hydraulic pumps 14, 15 of the drive units 18, 19.

Serving as actuating members 22 for operating and controlling the hydraulic pumps 14, 15, and hydraulic motors 16, 17 of the drive units 18, 19 associated with the wheels 8, 9 of the travel axis 7, are an adjustable gas lever 25 for adjusting the rate of rotation of the drive motor 4, and a rotatable operator handle 26 which controls drive units 18, 19, acting uniformly or in a differentiated manner on the wheels 8, 9, particularly the hydraulic pumps 14, 15 of the drive units 18, 19 for steering the work machine 1 or the rate of rotation of the wheels 8, 9 in a straight direction of movement or a direction of movement different from the straight line. Consequently, it is possible to turn the work machine 1 about a vertical axis using a driven and a stationary wheel 8 or 9 or with a pressurized and a pressureless hydraulic motor 16, 17 of the drive units 18, 19. In the present case, the rotatable operating handle 26 is constructed for this purpose with a bevel gear unit which connects a driven bevel gear or a Bowden pull system each for adjusting or changing one or both drive units 18, 19 or a hydraulic pump 14, 15. For this purpose, the hydraulic pumps 14, 15 each have an adjusting member 29 illustrated in FIG. 4 that is adjustably and settably coupled or connected to a control shaft 32 that is mounted on a frame 31 which is arranged on the chassis or undercarriage 3 so as to be pivotable about an axis 30 approximately perpendicular to the ground on which the travel takes place. The adjusting member 29 of a hydraulic pump 14, 15 is connected through a lever gear unit 33 to the control shaft 32, wherein the lever gear unit 33 has a one armed lever 34 fastened to the adjusting member 29, wherein the lever 34 is connected through a rod 36, 37 to a lever on 38, 39 attached or fastened to the control shaft 32. Spherical joints 40 are provided as connecting elements and, for changing or adjusting the length of the rods 36, 37, the spherical joints 40 and the rods 36, 37 are equipped at the ends thereof with a right handed thread and a left handed thread.

The control shaft 32 is supported below the lower flange 41 of the frame 31 constructed in the shape of a C, wherein, for this purpose, the spherical joints or stationary bearings 42 are screwed together at the freely projecting corners of the lower flange 41.

Pivotability of the frame 31 about the pivot axis 30 extending through the upper 44 and lower flange 41 approximately centrally and approximately along the rear wall 43 of the frame 31 is achieved by means of a pivot bearing 47 that is mounted to the chassis or undercarriage 3 and is composed of two individual bearings 45, 46. The individual bearings 45, 46 are composed of a screw 48 which penetrates the flanges 41, 44 from the inside toward the outside and a bearing plate 49, 50, respectively, which screws 48 are secured to the plate 49, 50 that extends substantially horizontally from the chassis or undercarriage 3. A nut with washer 51 on the screws 48 secures the individual, bearings 45, 46.

A double lever 52 is fastened to one end of the control shaft 32, at whose lever ends 53 a steel wire or steel rope, guided in a casing, of the rope pulls 27, 28 is hung. The rope pulls 27, 28 are held by the casing, inter alia, above the double lever 52 in the upper flange 44 of the frame 31. For guiding the first rope pull 28 through the lower flange 41, this lower flange 1 has a recess 55.

The guide bars 20, 21 extend through openings 56, 57 in the upper flange 44 of the frame 31 and are welded (see FIGS. 5 and 6) to the lower flange 41 in the same manner as the upper flange 44. In this connection, the guide bars 20, 21 are each arranged laterally offset from the pivoting axis 30 and at a distance from the rear wall 43 of the frame 31.

The frame 31 is fastened to the operator's side with the rear wall 33 at the rearward side, in the movement direction of the work machine, of the machine chassis and undercarriage 3.

Figure 6:
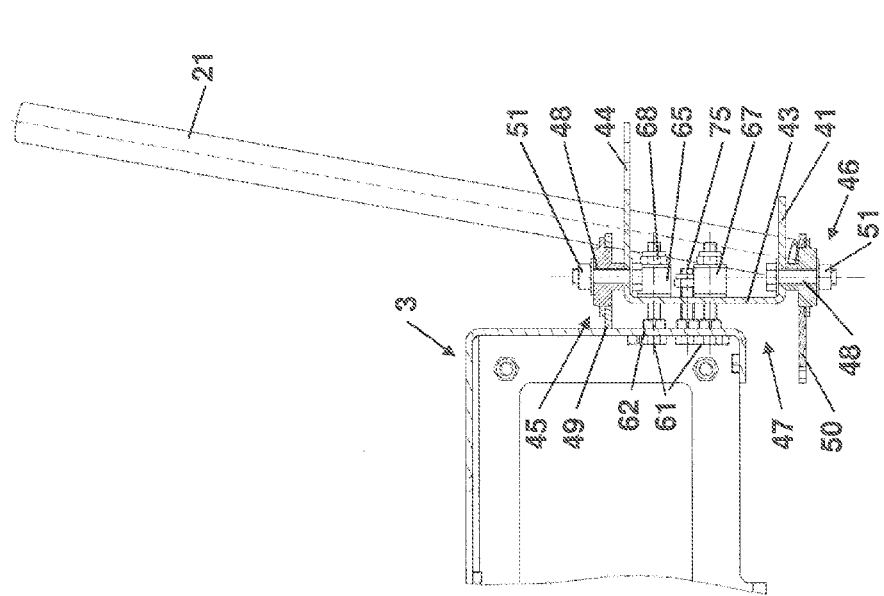
FIG. 6 is a sectional view along sectional VI-VI of the control device illustrated in FIG. 5.
Figure 5:
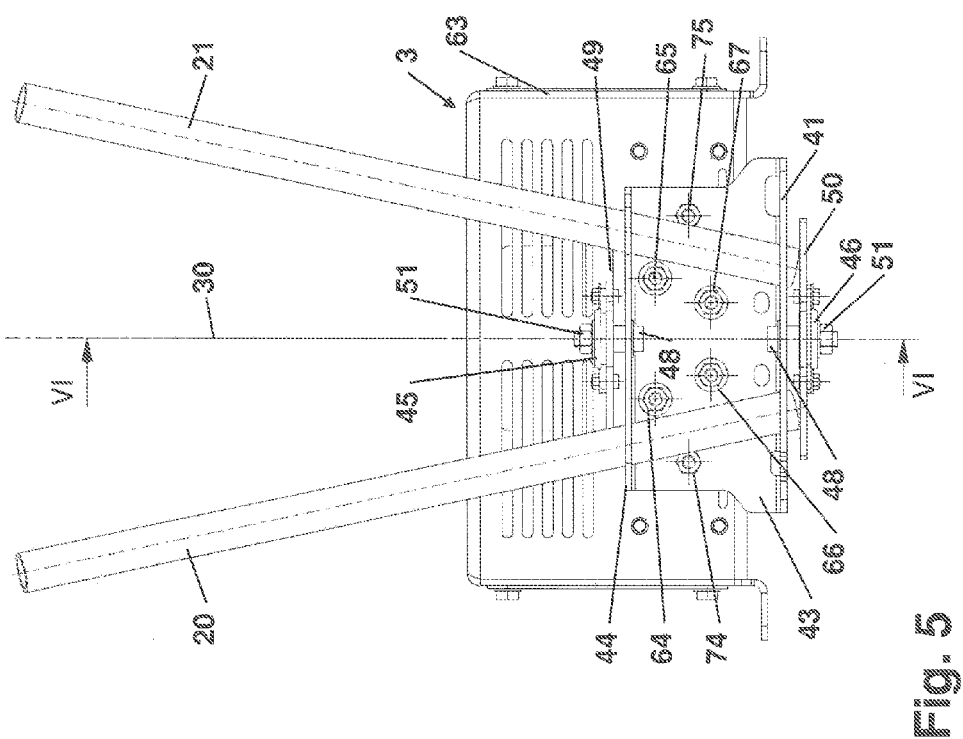
FIG. 5 is an elevational view of the control device from the operator's side of the work machine.

FIGS. 5 and 6 show in more detail how the frame 31 is fastened. The rear wall 43 has four bores through which a screw 61 each is guided and is connected by a nut 62 to a hood 63, and respectively to the machine chassis or undercarriage 3. The protruding shaft of the screw 61 extends through the rear wall 43 of the frame 31 and an elastic bearing 64 to 67 placed on the screw shaft rests against a nut 68, on the one hand, and against the inner side of the rear wall 43 of the frame 31.

The elastic bearings 64 to 67 which have been provided consist of a relatively hard rubber mixture and are also used, inter alia, as damping elements of supported machines and devices. They are also known as so-called silent blocks, rubber bearings or rubber spring elements and are considered to be maintenance free. For protection, the clamping ends of the elastic bearings are provided with cover disks of steel.

Alternatively, steel spring stacks could also be used however, they do not provide the same damping and elasticity effects as the mentioned elastomer bearings. The elasticity of the bearings 64 to 67 can be varied through the dimensions or the height or the length.

Figure 4:
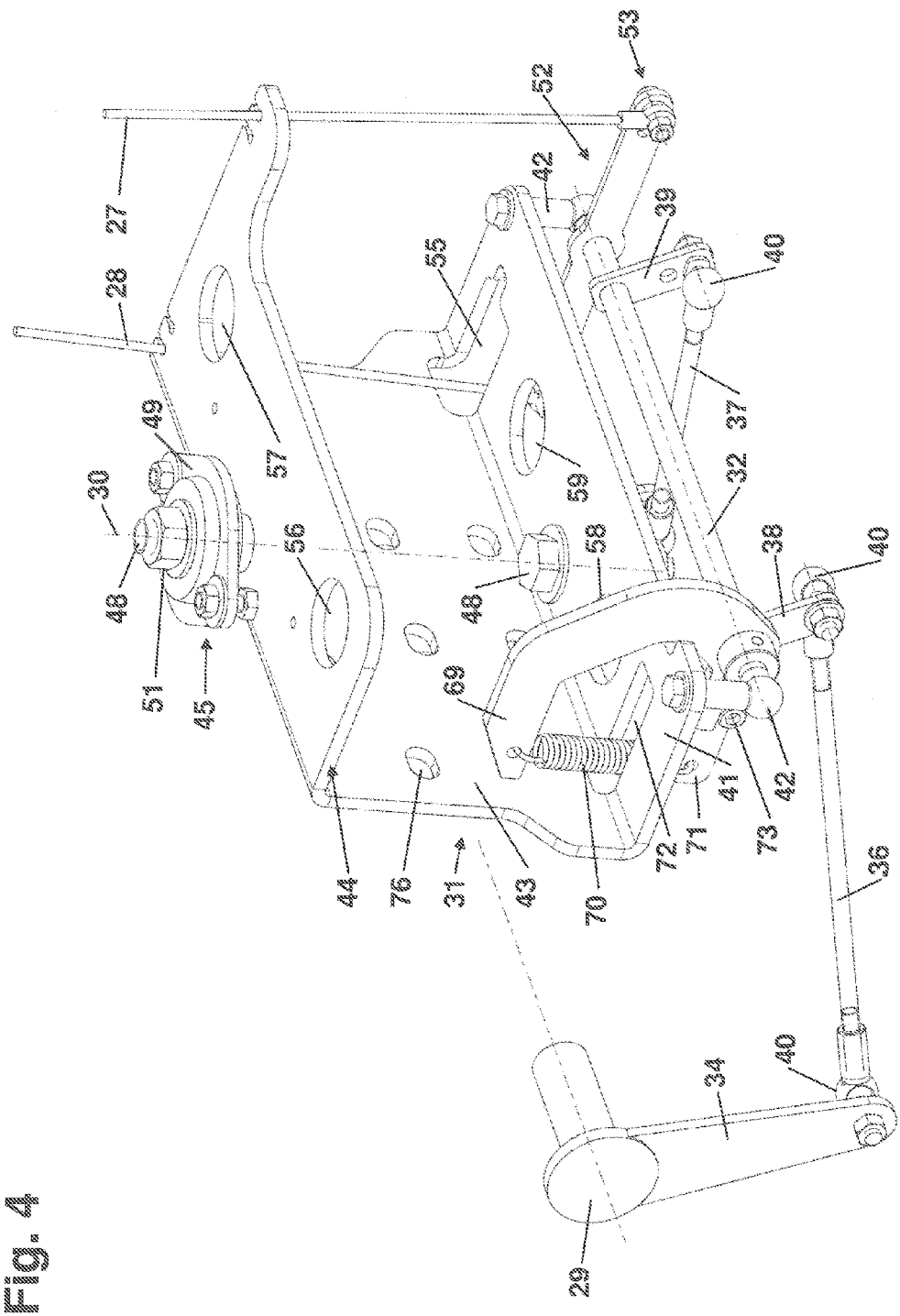
FIG. 4 is an extracted perspective view of a control device of the drive units assigned to the wheels of the drive axle of the work machine.

FIG. 4 shows control shaft 32 in an initial position for a straight direction of movement of the work machine 1 in which it is held under spring force. For this purpose, a curved lever 69 is at one end thereof rotatably supported at the control shaft 32, wherein the other end of the control shaft 32 impacts against the inner wall of the rear wall 43 of the frame 31 through the force of a spring 70, wherein the spring 70 constructed as a tension spring is attached with the opposite end of a pivot lever 71 attached to the control shaft 32. The arrangement of this return device is preferably on the frame 31 on the opposite side of the rope pulls 27, 28. For passing through the connected spring 70, another recess 72 is provided in the lower flange 41 of the frame 31. A screw head 73, at the double lever 38, is supported by the curved lever 69 serving as a stop and protruding from the bottom side of the lower flange 41 and takes along lever 69 in a counterclockwise direction when the shaft 32 is pivoted.

FIGS. 5 and 6 further show two pivot limiters 74, 75 for limiting the lateral pivoting movements of the frame 31. For this purpose, on both sides of the pivoting axis 30, two horizontally extending approximately oval throughopenings (only 76 visible in FIG. 4) are provided through which each screw, attached to the machine chassis and undercarriage 3, projects, which screw supports a nut at the free shaft end and forms a means respectively for limiting a left handed or right handed pivoting movement for the pivotable frame 31.

The gentle and sensitive subsequently following steering movements through the bearings 64 to 67 to the lever gear unit 33, with a length ratio ≤2:1 between the distance of the travel axis 7 to the pivot axis 30 of the frame 31, on the one hand, relative to the distance of the pivot axis 30 and to the free end of the guide bars at the operator handle 26, on the other hand, results in a significant advantage which has an effect on the operation of the work machine, as illustrated in FIG. 3.

While specific embodiments of the invention have been shown and described in detail to illustrate the inventive principles, it will be understood that the invention may be embodied otherwise without departing from such principle.

I claim:

1. A self-propelled, single axis motor driven work machine for propelling and/or for driving communal or agricultural work devices mounted on a mounting device, comprising: an undercarriage or machine chassis; a drive motor fastened to the undercarriage or machine chassis; a drive axle protruding transversely of a direction of movement of the machine from both sides of the undercarriage or machine chassis and hydraulically driven by the drive motor, the drive axle being formed of two drive shafts; a wheel mounted on each end of the drive axle and connected to one of the drive shafts; mounted guide rods that connect an operator's side of the drive shaft to the undercarriage or machine chassis for manually steering the work machine; drive units having hydraulic pumps and hydraulic motors for driving and steering the wheels of the drive axle; an actuating member mounted on the guide rods for operating and controlling the drive units; a frame mounted to the undercarriage or machine chassis so as to be pivotable relative to the undercarriage or machine chassis about a pivot axis substantially perpendicular to ground over which the machine travels; and a control shaft mounted to the frame, wherein one of the hydraulic pumps is connected for steering to the actuating member and includes an adjusting member that is coupled adjustably to the control shaft.

2. The machine according to claim 1, wherein the adjusting member is connected to the control shaft by a lever gear system.

3. The machine according to claim 2, wherein a lever arm or pivoting arm associated with each lever gear of the lever gear system is fastened on the control shaft.

4. The machine according to claim 2, wherein the control shaft or a lever gear of the lever gear system or the adjusting member is held in an initial position by spring force.

5. The machine according to claim 1, wherein the guide rods are each attached to the frame laterally offset relative to the pivot axis.

6. The machine according to claim 5, wherein the frame is arranged in the direction of movement on a rearward side or the operator's side of the undercarriage or machine chassis.

7. The machine according to claim 1, further comprising offset elastic bearings that support the frame at an end face of the undercarriage or machine chassis.

8. The machine according to claim 7, wherein the bearings are fastened at an inner side of a rear wall of the frame, the frame being formed as a C-section.

9. The machine according to claim 8, wherein the rear wall of the frame has slots or throughopenings extending transversely of the travel direction, through which the pivoting movement of the frame is limited by pivot limiters.

10. The machine according to claim 1, wherein the frame has an upper flange and a lower flange each mounted on an individual bearing forming a pivot bearing, and fastened in the undercarriage or machine chassis, the upper flange being spaced above the lower flange with their respective bearings aligned so that the flanges are pivotable about a substantially perpendicular pivoting axis.

11. The machine according to claim 10, wherein the actuating member includes two pull ropes connected to a double lever fastened to the control shaft.

12. The machine according to claim 11, wherein the pull ropes are guided in the upper flange of the frame.

13. The machine according to claim 12, wherein the lower flange of the frame has a recess for guiding one of the pull ropes therethrough.

14. The machine according to claim 10, wherein the control shaft is arranged underneath the lower flange of the frame.

15. The machine according to claim 1, wherein a ratio between a distance of the travel axis from the pivot axis of the frame and a distance of the pivot axis of the frame from the free ends of the guide rods is ≤2:1.

* * * * *